Oct. 19, 1937. G. SAUER 2,096,343
TRANSMISSION MECHANISM FOR SEWING MACHINES
Filed Jan. 24, 1935 4 Sheets-Sheet 3
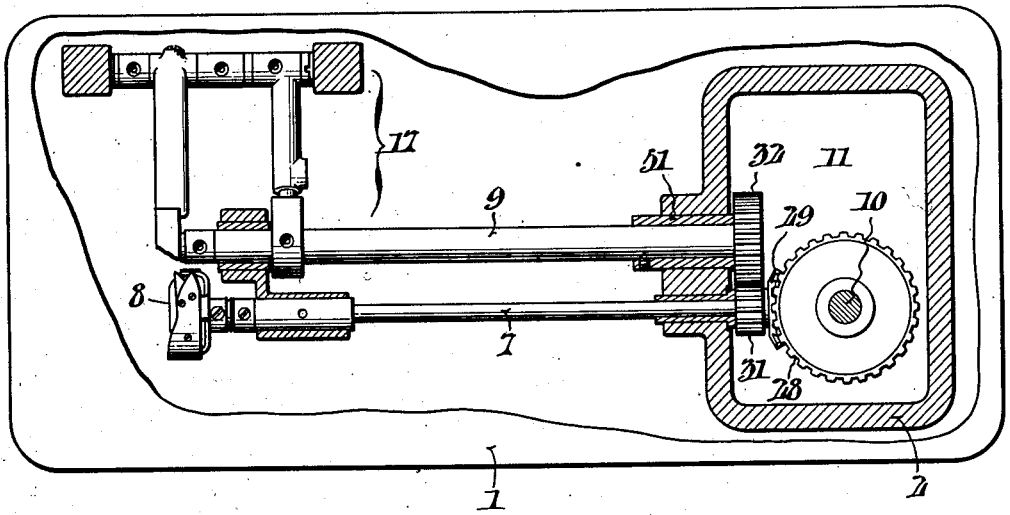
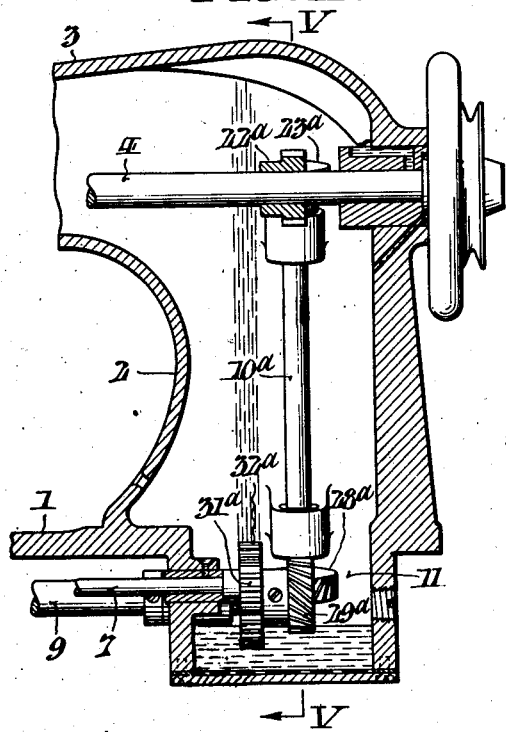
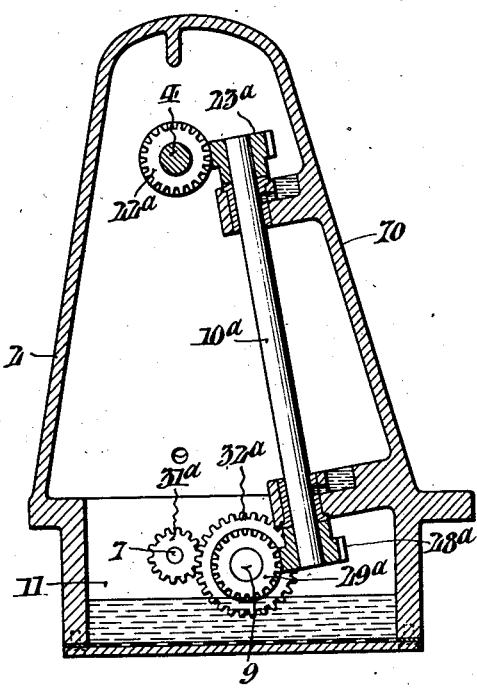
WITNESSES:
Thomas W. Kerr
John A. Weidler
INVENTOR:
George Sauer,
BY Frally Paul
ATTORNEYS.

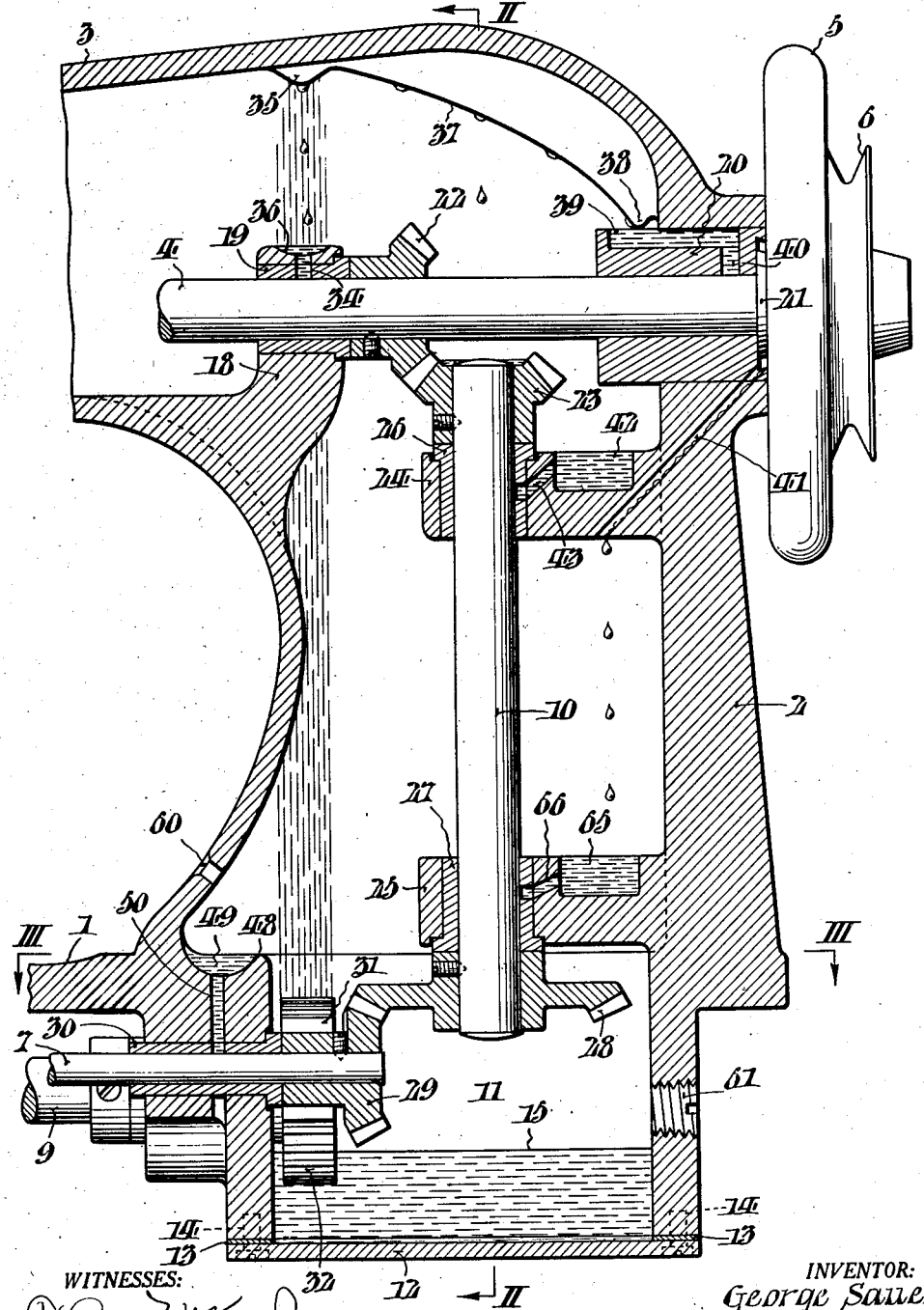

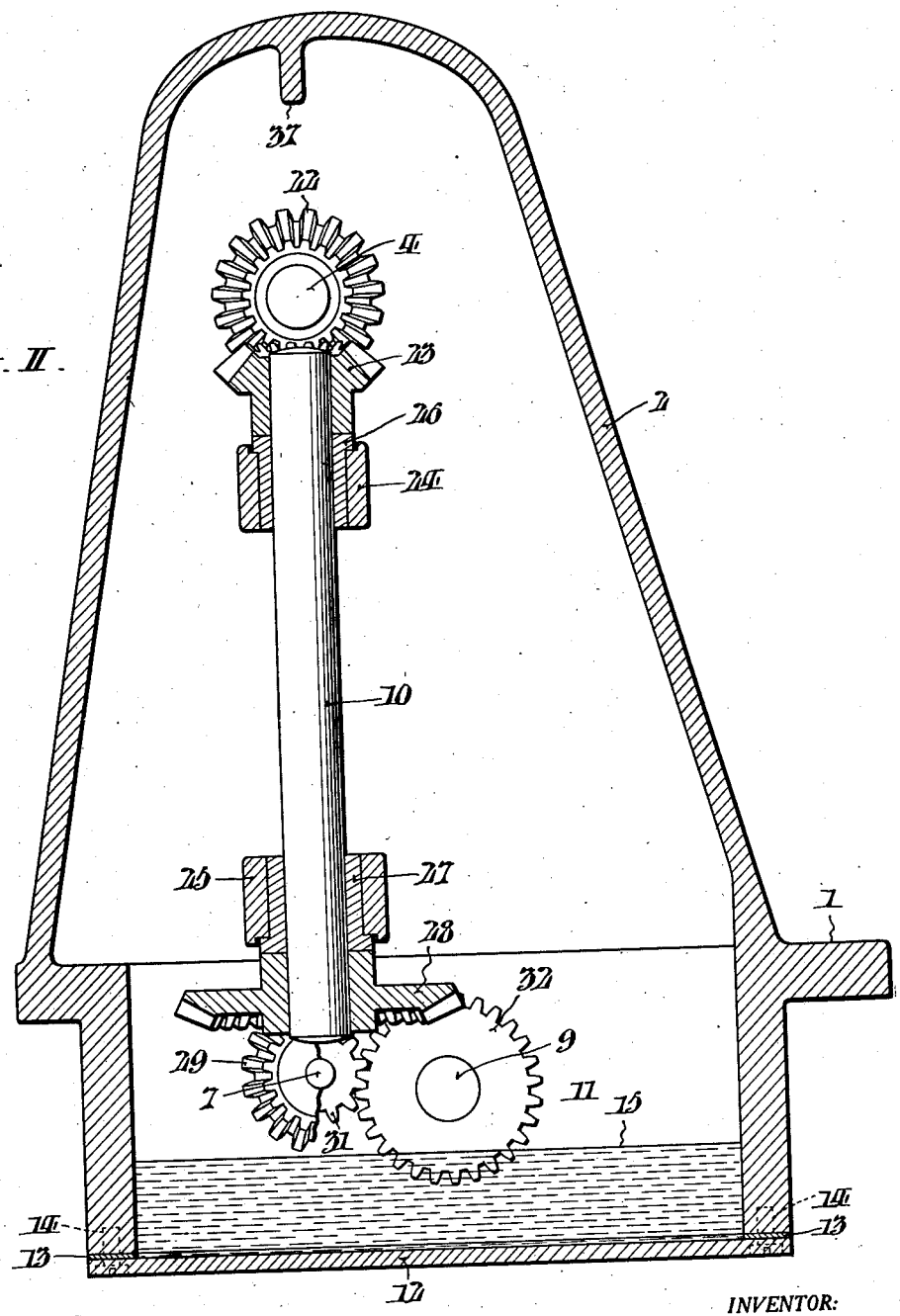

Oct. 19, 1937.  G. SAUER  2,096,343
TRANSMISSION MECHANISM FOR SEWING MACHINES
Filed Jan. 24, 1935  4 Sheets-Sheet 4
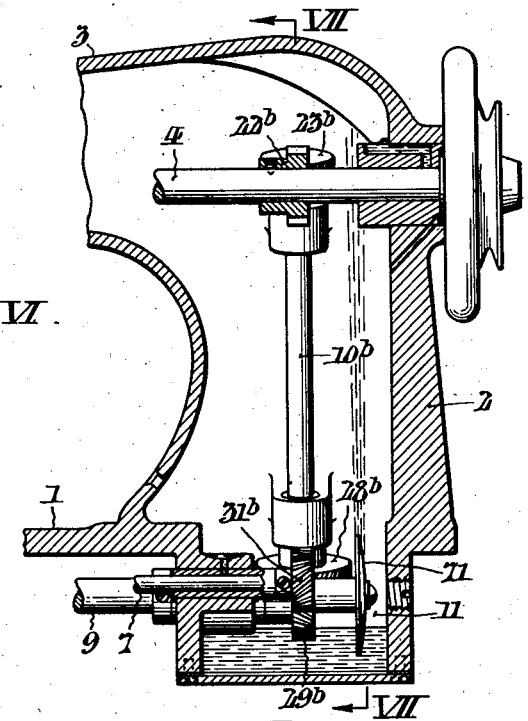
FIG. VI.
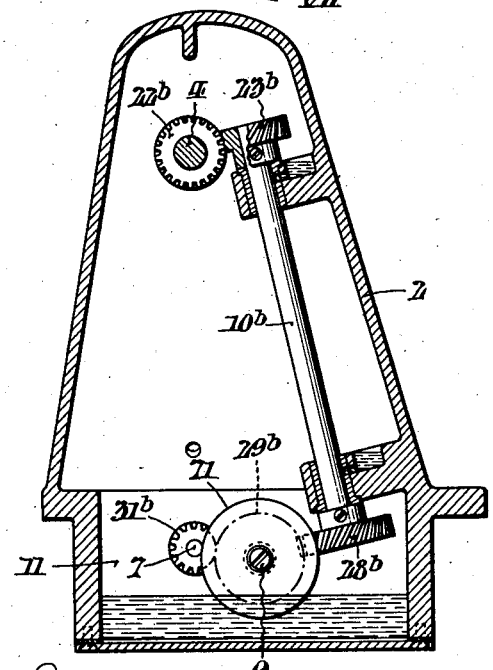
FIG. VII.
WITNESSES:
Thomas W. Kerr Jr.
John A. Weidler
INVENTOR:
George Sauer,
BY Fraley Paul
ATTORNEYS.

Patented Oct. 19, 1937

2,096,343

UNITED STATES PATENT OFFICE 2,096,343

TRANSMISSION MECHANISM FOR SEWING MACHINES

George Sauer, Berwyn, Ill., assignor to Union Special Machine Company, Chicago, Ill., a corporation of Illinois Application January 24, 1935, Serial No. 3,230

7 Claims. (Cl. 112—256)

This invention relates to a transmission mechanism for a sewing machine and is especially applicable to machines of the lock stitch type. It has particular reference to the means employed for transmitting rotary motion from a main or needle actuating shaft to an auxiliary shaft used for the operation of a rotary hook, or other complemental stitch forming mechanism, or to a rotary shaft used for the operation of a feed mechanism.

With lock stitch machines which are adapted for operation at relatively high speeds, difficulties have been experienced in providing adequate lubrication for the rotary parts. The provision of numerous oil ducts for the transmission mechanism which must be separately filled by the operator and which require frequent attention is objectionable for obvious reasons. Moreover, it is not only desirable to reduce the number of oil filling openings and to minimize the possibility of oil spreading on the exterior surfaces of the machine, but it is important also to provide an efficient manner of lubricating all parts which are designed to rotate at high speeds.

The principal object of this invention is to provide a transmission mechanism and a system of lubrication therefor which will enable the machine to be operated at a high speed with avoidance of the difficulties described above. To this end the machine of this invention is characterized by the concentration of the parts to be lubricated in a closed chamber and by the provision of novel means for conveying the lubricant throughout the chamber and distributing it to the critical points which require lubrication.

A more specific object of the invention is to provide in a sewing machine having a plurality of rotary shafts beneath the work support which derive their movement from the main or needle actuating shaft, a transmission in which all of the gears used for connecting the several shafts are disposed within the lubricating chamber in the standard of the machine, thus avoiding the necessity of employing separate lubricating systems at different points for the parts of the transmission.

Other objects and advantages characterizing my invention will become more apparent from the description hereinafter set forth of several examples of the practice of the invention, having reference to the accompanying drawings. Of the drawings:

Fig. I represents a longitudinal cross section of the standard of a lock stitch sewing machine embodying one form of the invention.

Fig. II represents a transverse cross section of the same, taken as indicated by the lines II—II of Fig. I.

Fig. III represents a plan view of the machine with portions of the work support and standard shown in section, taken as indicated by the lines III—III of Fig. I, to reveal the mechanism located at the base of the machine.

Fig. IV represents a longitudinal cross section of a sewing machine showing an alternate form of the invention in which a combination of spur gears and spiral gears is used in the transmission.

Fig. V represents a transverse cross section of the machine of Fig. IV, taken as indicated by the lines V—V of that figure.

Fig. VI represents a longitudinal cross section of the standard of a sewing machine showing another form of the invention wherein all of the gears of the transmission are spiral gears; and, Fig. VII represents a transverse cross section of the same, taken as indicated by the lines VII—VII of Fig. VI.

With particular reference to Figs. I, II, and III of the drawings, there is shown a portion of a lockstitch sewing machine of the type described in the pending application for U. S. Letters Patent of Norman V. Christensen and Charles F. Rubel, Serial No. 670,186, filed May 9, 1933. The machine has a frame comprising generally a work support 1, a hollow standard 2, and an arm 3 carried by the standard and overhanging the work support. Extending within the arm 3 there is a main or needle actuating shaft 4 having at the end thereof the usual hand wheel 5 and belt pulley 6. Journaled for rotation beneath the work support are two parallel shafts, one shaft 7 serving to drive a rotary hook, designated at 8 in Fig. III, and the other shaft 9 serving to actuate the feed mechanism which is comprehensively designated at 17. The feed mechanism may be considered to operate in the manner described in the pending application for U. S. Letters Patent of George Sauer and Clarence C. Smith, Serial No. 673,738, filed May 31, 1933 and further description thereof is deemed unnecessary. Rotary motion of the main shaft 4 is transmitted to the rotary hook shaft 7 and to the feed shaft 9 through a connecting shaft 10 which extends upwardly through the standard 2.

At its base the hollow standard 2 is formed with a lubricant reservoir 11. The bottom of the standard is closed by a cover plate 12, a gasket 13 being preferably provided between the cover plate and standard, and screws 14 being employed to secure the cover plate in place. The oil carried in the standard is represented at 15. It will be observed that this construction provides a closed chamber for the lubricant which is confined to the interior of the standard 2 and a portion of the overhanging arm 3. The parts employed for transmitting motion from the main shaft 4 to the parallel shafts 7 and 9 are all housed within the lubricating chamber so formed.

In the illustrated example of this invention, the main shaft 4, as shown most clearly in Fig. I, has its end supported in a bearing 20 adjacent to the hand wheel 5, and has an intermediate portion supported in a bearing 19 which is carried by an interiorly projecting lug 18 formed integrally with the machine frame at the juncture of the standard 2 with the overhanging arm 3. The main shaft has a collar 21 thereon adjacent to the hand wheel 5. On the main shaft 4 there is provided a bevel gear 22 which meshes with a similar gear 23 secured to the upper end of the vertical connecting shaft 10. The connecting shaft 10 is journaled for rotation within laterally projecting bearing supports in the form of lugs 24, 25 formed integrally with the hollow standard. The upper lug 24 supports a bearing 26, and the lower lug 25 supports a bearing 27. Motion is transmitted from the vertical shaft 10 directly to the rotary hook shaft 7 through a bevel gear 28 on the connecting shaft 10 which meshes with a similar bevel gear 29 secured to the end of the rotary hook shaft 7. The rotary hook shaft 7 is journaled for rotation in a bearing 30. On the rotary hook shaft 7 there is provided a spur gear 31, as shown most clearly in Figs. II and III, which meshes with and serves to drive a spur gear 32 affixed to the feed shaft 9. Desirably the gears 31, 32 are so proportioned that the rotary hook shaft 7 has two revolutions to each revolution of the feed shaft 9. The spur gear 32 on the feed shaft 9 serves not only as a means for transmitting motion to the feed shaft, but serves also as a centrifugal throwing device for distributing lubricant throughout the standard 2.

With rotation of the feed shaft 9 the spur gear 32 conveys lubricant from the reservoir 11 in a substantially vertical direction to the top of the standard 2 with incidental distribution of the lubricant on the interior surfaces of the standard. With the standard 2 interiorly formed in the manner shown, there is provided an open passage between the bearing supports 24, 25 and the walls of the standard through which the lubricant may pass freely from the reservoir 11 to the roof of the standard. At the roof of the standard there is desirably provided a depending rib 37 located vertically above the main shaft 4. This rib serves to guide the lubricant collected at the top of the standard so that a portion thereof drips downwardly from a pointed projection 35 into a well 36 at the top of the projecting lug 18 and from thence through a duct 34 in the bearing 19 to the shaft 4. Another portion of the rib 37 leads downwardly in the direction of the main shaft bearing 20 and terminates in a pointed projection 38 which is disposed above a lubricant receiving duct 39 at the top of the bearing 20. A duct 40 leads from the pocket 39 to the end portion of the shaft 4. Oil finds its way along the shaft 4 to the collar 21, and thence through a duct 41 which leads back to the interior of the standard in the space between the bearing supports 24, 25. In this manner an ample supply of lubricant is furnished to the main shaft bearings 19, 20.

Oil distributed throughout the standard 2 by the centrifugal action of the spur gear 32 drips downwardly from the roof of the standard upon the bevel gears 22, 23, and a portion of it collects in a well 42 formed in the upper bearing support 24. From the well 42 this oil is carried by a duct 43 leading through the bearing 26 to the connecting shaft 10.

On the lower bearing support 25 there is provided a well 65, and oil collected in the well 65 leads through a duct 66 to the bearing 27. Above the parallel shafts 7 and 9, the standard 2 is formed with a ledge 48 having a well 49 therein. Lubricant collected in the well 49 is free to pass through a vertical duct 50 to the bearing 30 for the rotary hook shaft 7 and through a similar duct, not shown in the drawings, oil may also be distributed to a bearing 51 for the feed shaft 9.

The operation of the transmission mechanism, and the lubricating system therefor, will be apparent from the above description of its component parts. It will be observed that the system causes circulation of the lubricant from the reservoir 11 to all of the upper and lower sets of gears and to all of the upper and lower sets of bearings, with the lubricant eventually returned to the reservoir through the various ducts and the open passage which extends vertically from the base to the roof of the standard. Accordingly, while the machine is in operation the lubricant is continuously circulated from the reservoir to all of the parts which require lubrication, and as long as the reservoir is replenished from time to time, lubrication of all parts is assured. For the purpose of filling the reservoir 11 there is provided a fill opening 60 which may be conveniently disposed within the curved portion of the standard 2 above the work support 1. To permit periodic inspection of the oil reservoir 11, a plug 61 is preferably provided at the base of the standard immediately below the level of the parallel shafts 7 and 9. In the event that too much oil is admitted to the reservoir 11, the level may be reduced to the desired point by removing the plug 61 and permitting a portion of the oil to escape. At any time a measurement of the depth of the oil may be taken through the opening in which the plug 61 is inserted.

It will be observed that the described arrangement provides a concentration of all of the gears of the transmission within a closed lubricating chamber formed in the standard 2. Thus all of the gears are lubricated by a single lubricating system disposed away from the work end of the machine.

In Figs. IV and V, there is shown a modified form of the invention in which the transmission is characterized by a combination of spiral gears and spur gears. In this form of the invention the main shaft 4 is connected to the feed shaft 9 through a vertical shaft 10a. The connecting shaft 10a has at its upper end a pair of spiral gears 22a, 23a, and at its lower end another pair of spiral gears 28a, 29a. The gear 29a is affixed to the feed shaft 9 and adjacent to this gear there is provided a spur gear 32a which meshes with a spur gear 31a on the rotary hook shaft 7. The spur gear 32a projects downwardly into the oil reservoir 11 and serves as a means for distributing lubricant throughout the standard 2. In this form of the invention the vertical shaft 10a is disposed to one side of the center of the standard 2 and preferably inclined at an angle paralleling the rear wall 70 of the standard. This arrangement leaves an unobstructed space between the main shaft 4 and the lower parallel shafts 7 and 9. There is advantage in thus permitting the lubricant to pass freely to the roof of the standard and to the upper set of gears. It will be observed that in the arrangement shown in Figs. IV and V the feed shaft 9 is driven directly from the connecting shaft 10a and the drive for the rotary hook shaft 7 is taken off the feed shaft.

In Figs VI and VII there is shown another modification of the machine of this invention, the principal characteristic of this modification being that the gears of the transmission are all spiral gears and that a separate centrifugal throwing device is employed. More particularly, the motion of the main shaft 4 is transmitted to the vertical shaft 10b through spiral gears 22b, 23b, and the motion of the connecting shaft 10b is transmitted to the feed shaft 9 through a pair of spiral gears 28b, 29b. The gear 29b on the feed shaft 9 acts as both a follower and a driver. It meshes with a smaller gear 31b on the rotary hook shaft 7. Oil is distributed throughout the standard 2 by means of a centrifugal throwing device in the form of a cup shaped disk 71 mounted on the feed shaft 9 and projecting into the lubricant reservoir 11.

It will be apparent that in all of the various forms represented in the drawings the power transmitting connections between the upper and lower shafts are all located within the closed lubricating chamber of the standard and as long as the reservoir of the standard remains filled lubrication of these parts is assured.

While I have described my invention with reference to several examples of the practice thereof, and have referred in some detail to the particular construction of the machines illustrated in the drawings, it will be apparent that numerous changes may be made in the form of the apparatus herein described and illustrated without departing from the spirit of the invention as defined in the annexed claims. In referring herein to a standard which is "closed at the base" to form a lubricant reservoir, such words are used in a general sense, and it is not my intention to limit the invention to the use of a removable closure plate or similar device at the base of the standard.

Having thus described my invention, I claim:

1. In a sewing machine, a frame comprising a work support, a hollow standard, and an arm carried by the standard and overhanging the work support, said standard being closed at the base thereof to form a lubricant reservoir, stitch forming mechanism including a main shaft within the overhanging arm, a shaft beneath the work support for operating a feeding mechanism, an additional shaft beneath the work support for operating a rotary hook, a connecting shaft extending upwardly through the standard, and gears connecting all of said shafts within the standard, one of said gears serving to distribute lubricant from said reservoir to all of said gears.

2. In a sewing machine, a frame comprising a work support, a hollow standard, and an arm carried by the standard and overhanging the work support, said standard being closed at the base thereof to form a lubricant reservoir, stitch forming mechanism including a main shaft within the overhanging arm, a pair of shafts extending from said reservoir through the base of the standard to positions beneath the work support for operating feeding mechanism and a rotary hook, a connecting shaft extending upwardly through the standard, and a set of gears connecting said pair of shafts with said connecting shaft, all of the gears of said set being disposed within the lubricant reservoir, and one of said gears serving to distribute lubricant throughout the standard.

3. In a sewing machine, a frame comprising a work support, a hollow standard, and an arm carried by the standard and overhanging the work support, said standard being closed at the base thereof to form a lubricant reservoir, stitch forming mechanism including a main shaft within the overhanging arm, parallel shafts beneath the work support for operating a feeding mechanism and a rotary hook, a connecting shaft extending upwardly through the standard, gears connecting said main shaft and said parallel shafts with said connecting shaft, bearings within said hollow standard for supporting said connecting shaft and the adjacent ends of said main shaft and said parallel shafts, and one of the gears aforesaid serving to distribute lubricant from said reservoir to all of said gears and bearings.

4. In a sewing machine, a frame comprising a work support, a hollow standard, and an arm carried by the standard and overhanging the work support, said standard being closed at the base thereof to form a lubricant reservoir, stitch forming mechanism including a main shaft within the overhanging arm, parallel shafts beneath the work support for operating a feeding mechanism and a rotary hook, a connecting shaft extending upwardly through the standard, an upper set of gears connecting said main shaft with said connecting shaft, a lower set of gears connecting said parallel shafts with said connecting shaft within the hollow standard and serving to drive the rotary hook shaft at a greater speed than the shaft for the feeding mechanism, said lower set of gears being disposed within the lubricant reservoir, and one of said gears serving to convey lubricant from said reservoir to all parts of said hollow standard.

5. In a sewing machine, a work support, a hollow standard, an arm carried by the standard and overhanging the work support, stitch forming mechanism including a main shaft within the overhanging arm, parallel shafts beneath the work support, and a shaft within the hollow standard, sets of gears connecting all of said shafts within the standard, and a lubricant reservoir formed within the base of the standard, some of said gears serving to connect the parallel shafts beneath the work support, and one of said connecting gears projecting into the lubricant reservoir and being adapted to throw lubricant from the reservoir through the hollow standard to the uppermost gears.

6. In a sewing machine, a frame comprising a work support, a hollow standard, and an arm carried by the standard and overhanging the work support, said standard being closed at the base thereof to form a lubricant reservoir, stitch forming mechanism including a main shaft within the overhanging arm and a shaft beneath the work support, gears connecting said shafts within the standard, spaced bearings disposed at the top of the standard for supporting said main shaft, means for distributing lubricant from said reservoir to the top of the standard, and a rib depending from and extending across the top of the standard and having projections thereon, each disposed above one of said bearings, said rib serving to guide the lubricant collected at the top of the standard so that a portion thereof tends to drip down to each of said spaced bearings and a portion tends to drip down upon the gears.

7. In a sewing machine, a frame comprising a work support, a hollow standard, and an arm carried by the standard and overhanging the work support, said standard being closed at the base thereof to form a lubricant reservoir, stitch forming and feeding mechanism including a main shaft disposed substantially horizontally within the overhanging arm, a shaft disposed substantially horizontally beneath the work support, and a connecting shaft extending upwardly through the standard, and gears connecting said shafts within the standard, one of said gears serving to distribute lubricant from said reservoir to the remainder of said gears, the connecting shaft being disposed adjacent to a wall of the standard; and the central region of the standard being unobstructed in the space between the horizontal shafts to permit the free passage of the lubricant therethrough.

GEORGE SAUER.